July 29, 1941. E. L. SMITH ET AL 2,251,172
GUM BREAKING MACHINE
Filed May 22, 1940 5 Sheets-Sheet 3
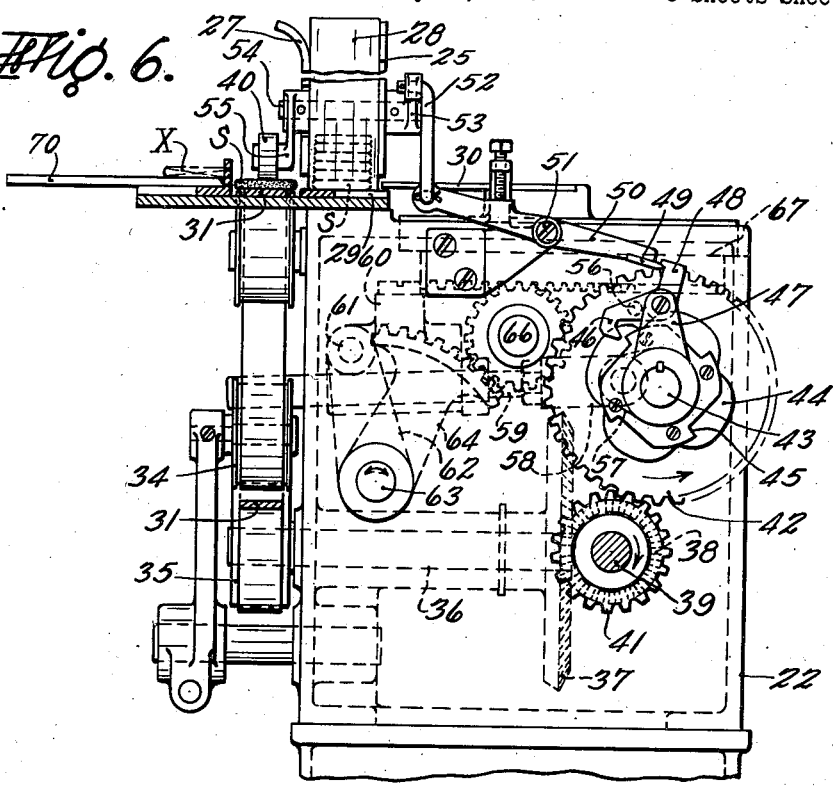
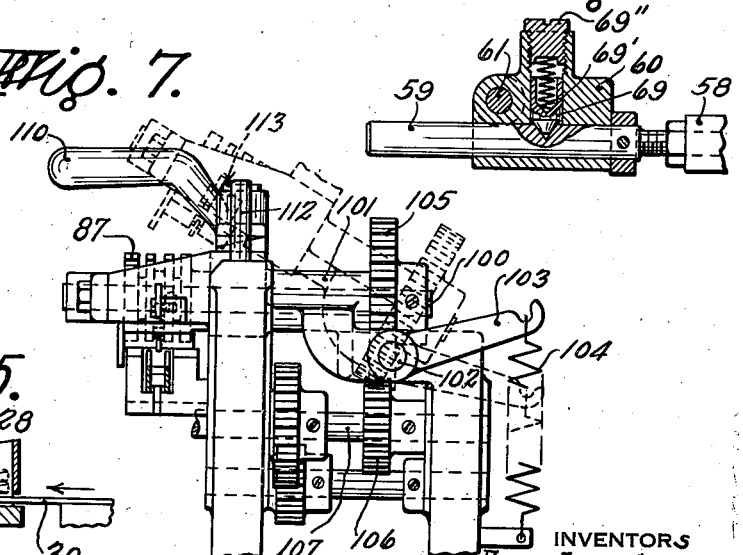
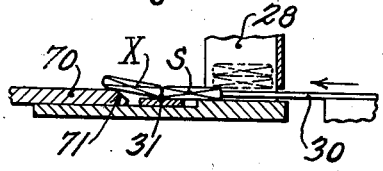
INVENTORS
ELMER LOVELL SMITH AND
BY EDWARD F. CORNOCK
Chapin & Neal
ATTORNEYS

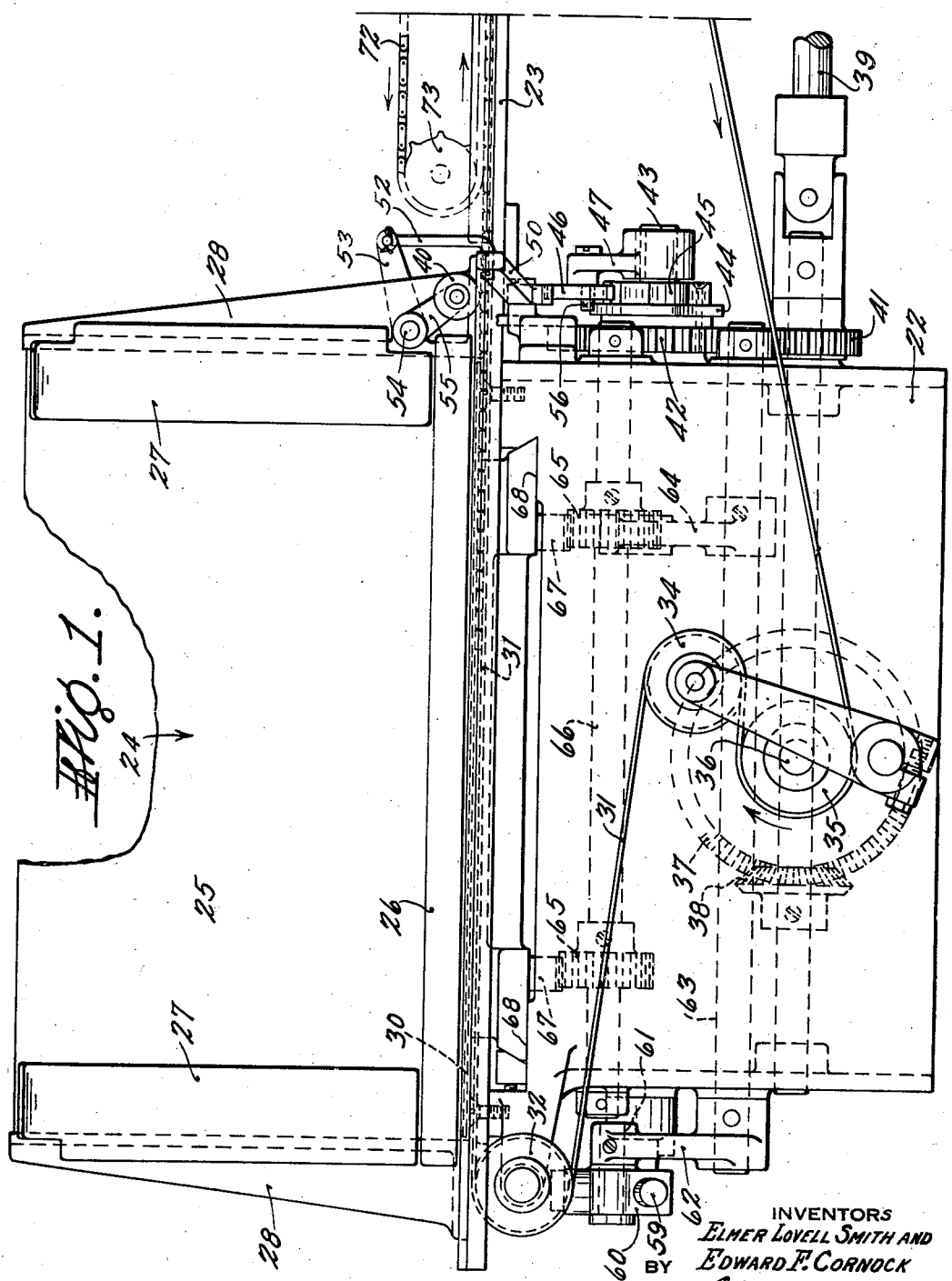

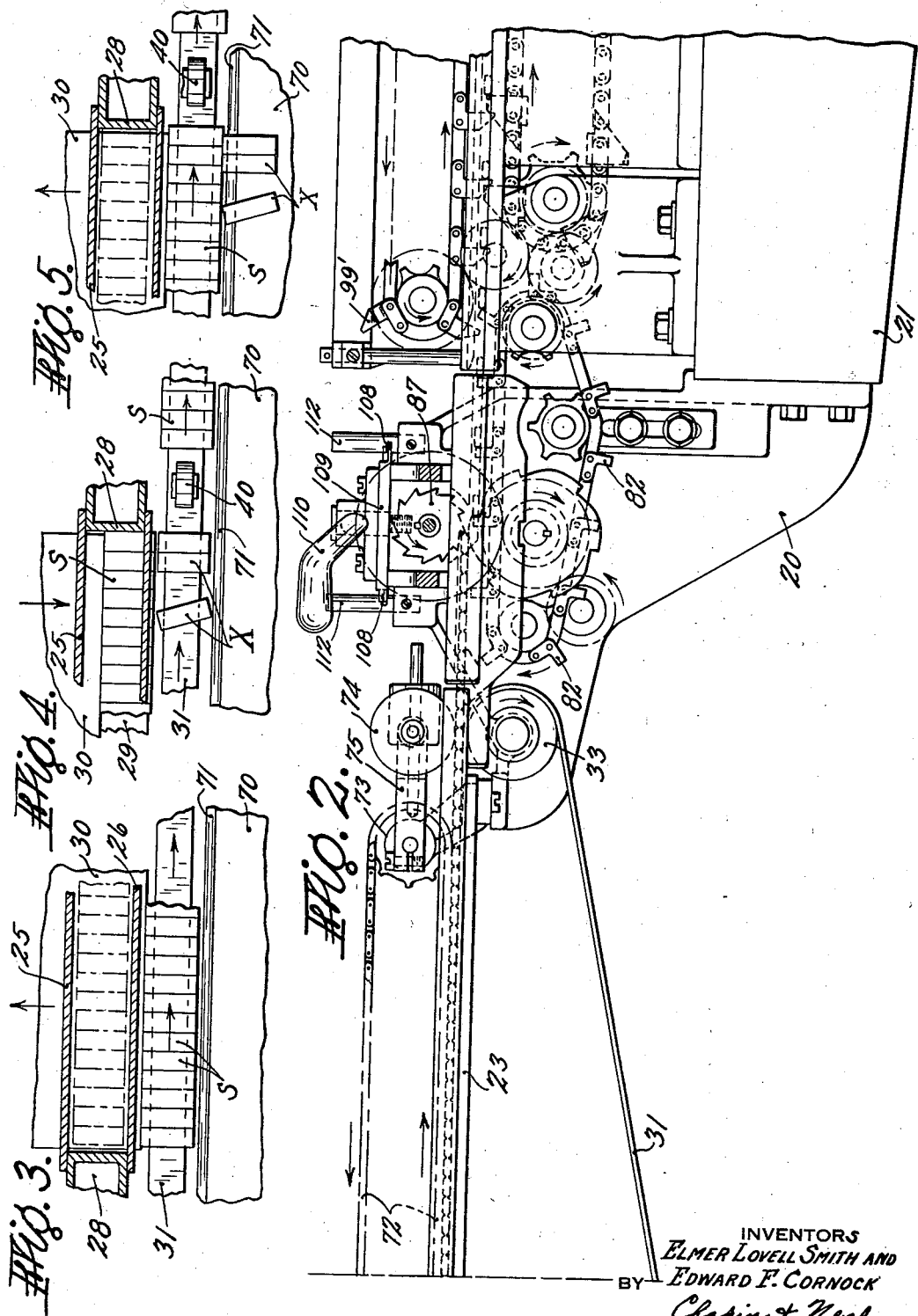

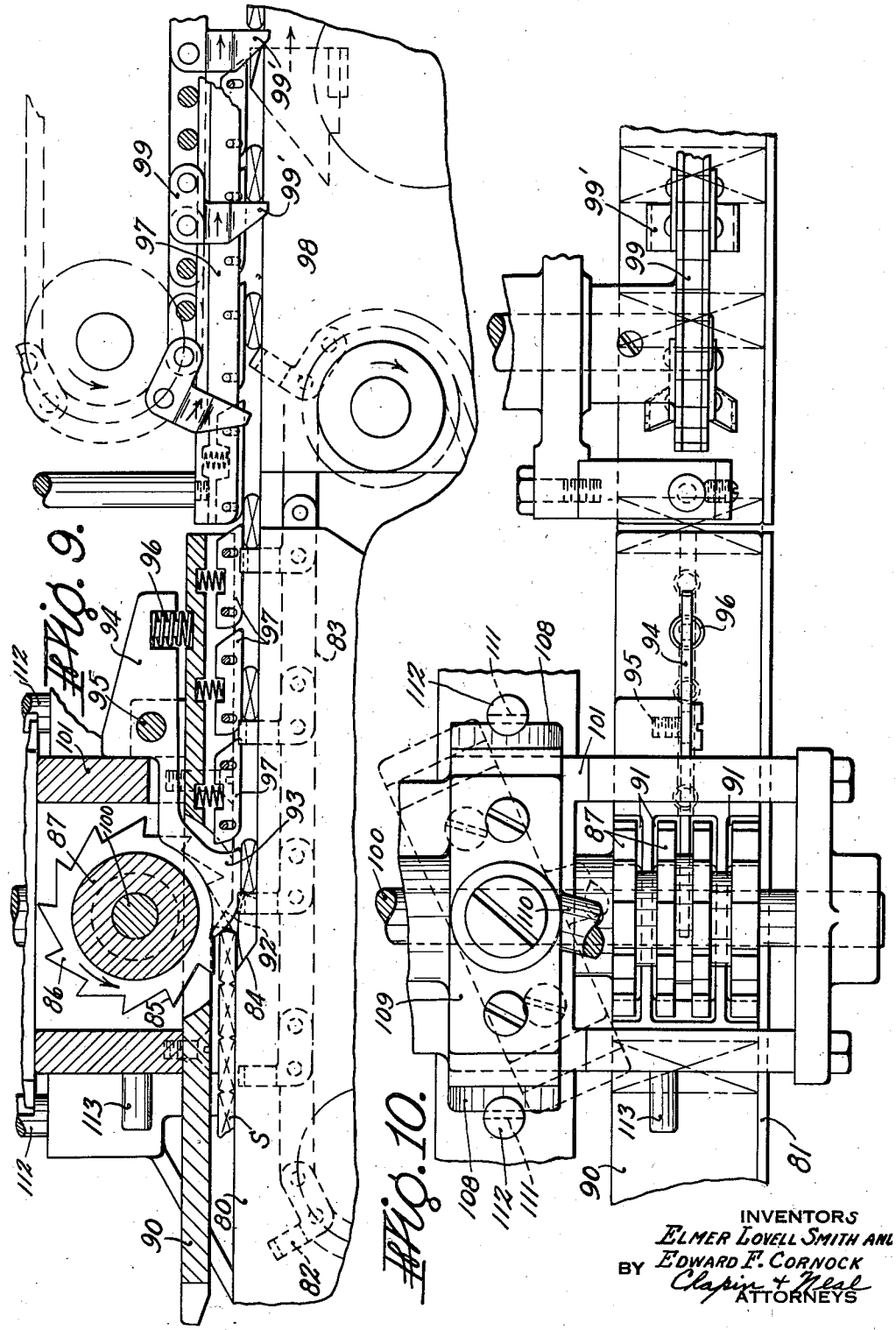

July 29, 1941.  E. L. SMITH ET AL  2,251,172
GUM BREAKING MACHINE
Filed May 22, 1940   5 Sheets-Sheet 5
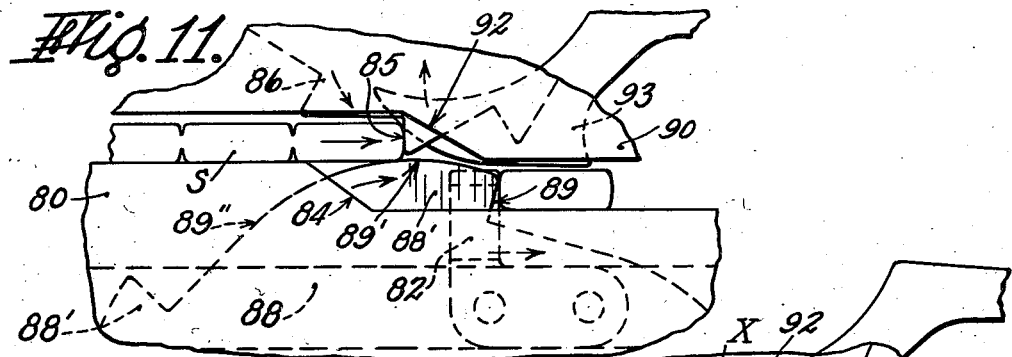
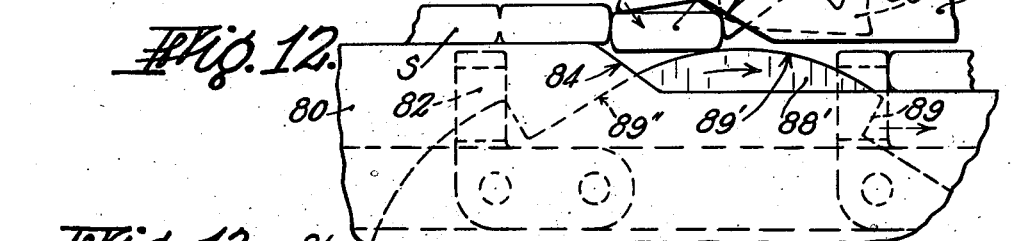
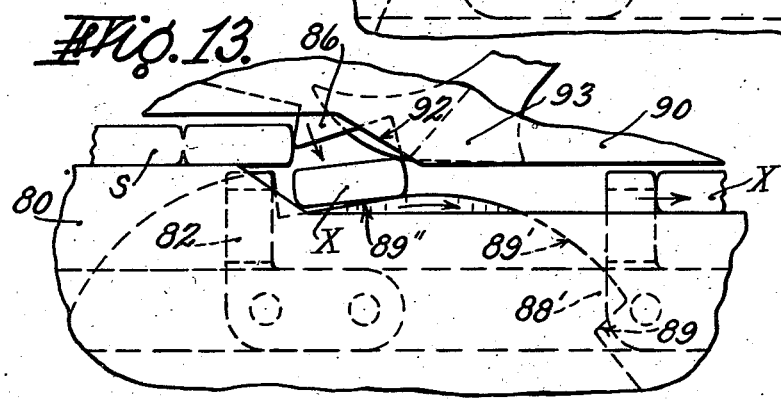
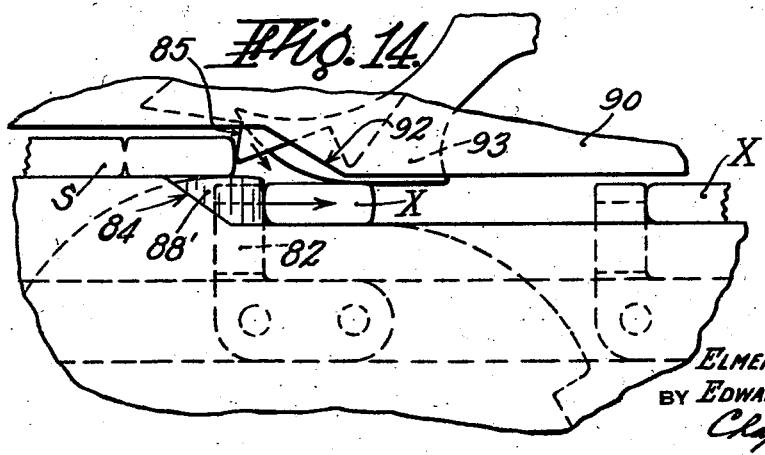
INVENTORS
ELMER LOVELL SMITH AND
BY EDWARD F. CORNOCK
Clapin & Neal
ATTORNEYS Patented July 29, 1941

2,251,172

UNITED STATES PATENT OFFICE 2,251,172

GUM BREAKING MACHINE

Elmer Lovell Smith, Longmeadow, and Edward F. Cornock, Springfield, Mass., assignors to Package Machinery Company, Springfield, Mass., a corporation of Massachusetts Application May 22, 1940, Serial No. 336,508

19 Claims. (Cl. 107—7)

This invention relates to a method and a machine for breaking gum sticks from slabs and for delivering the broken off pieces individually to a wrapping machine or similar handling device.

It is generally customary to form chewing gum in slabs of a width equal to the length of an individual gum stick, and of a length equal to a large multiple of the width of an individual stick. These slabs are then passed through a device which either slits the slabs transversely into individual sticks or scores the slabs on transverse lines so deeply that they can be broken readily at a later time. The individual sticks thus cut or broken from the slabs are finally stacked manually in the hopper of a wrapping machine. Since wrapping machines operate at the rate of many hundred sticks a minute, the labor of keeping the hopper filled is very great. It is the object of the present invention to provide a machine permitting the gum slabs in scored but uncut form to be manually stacked in a magazine, but having means to feed the slabs from the magazine, break the sticks from the slabs, and deliver the sticks individually to the wrapping machine, all automatically. The saving in labor will be obvious, since each slab contains many sticks and on account of its more convenient size is more easily handled.

The invention will now be described with reference to the accompanying drawings, in which Fig. 1 is a fragmentary side elevation of a machine embodying the invention;

Fig. 2 is a continuation of Fig. 1;

Figs. 3, 4, and 5 are details showing the action of the slab feeding mechanism under normal and abnormal conditions;

Fig. 6 is a detail of the slab feeding mechanism, looking from the right in Fig. 1 and omitting the upper delivery chain;

Fig. 7 is a detail of the gum breaking mechanism shown in Fig. 2 showing the driving gearing;

Fig. 8 is a detail of an overload release for the slab feeding mechanism;

Fig. 9 is a longitudinal section through the gum breaking mechanism, taken on an enlarged scale;

Fig. 10 is a top plan view through the mechanism shown in Fig. 9;

Figs. 11 to 14 are details, on a still larger scale, showing successive stages in the operation of the gum breaking mechanism; and Fig. 15 is a detail of the slab feeding mechanism under abnormal conditions.

Referring first to Figs. 1 and 2, the mechanism for breaking gum sticks from the slabs is carried by a bracket 20 extending from the frame 21 of a wrapping machine to which the sticks are to be fed. The mechanism for delivering the slabs from their hopper is carried on a frame 22, the two sets of mechanism being joined by a bridge piece 23 supporting the slab feeding conveyor. The hopper 24 (Figs. 1 and 3-5) is composed of a back piece 25, a lower front piece 26 extending all the way across the front, upper front pieces 27 separated sufficiently to permit the easy insertion of fresh gum slabs, and end pieces 28 fitting between the front and rear members. The gum slabs S are received upon a bottom piece 29, the front piece 26 being spaced sufficiently above this bottom to permit the lowermost slab to be pushed out by a reciprocating pusher 30. When a slab is pushed out it is received upon a continuously moving belt conveyor 31 passing over the bridge 23 and over end pulleys 32 and 33. Intermediate its return run the belt is held by an adjustable tightening pulley 34 against a drive pulley 35 fixed to a transverse shaft 36. This shaft carries a bevel gear 37 meshing with a gear 38 on a shaft 39 driven from any convenient source of power, preferably from the wrapping machine with which the device is intended to operate.

The pusher 30 is arranged to be operated from the shaft 39 whenever the slab being forwarded by the belt 31 passes beyond a detecting roll 40. For this purpose the shaft 39 (Fig. 6) has a gear 41 fixed to it which meshes with a larger gear 42 freely rotatable on a shaft 43. Secured to the face of the latter gear is a four-lobed cam 44 and a four-toothed ratchet 45. A pawl 46 for cooperation with the ratchet is pivoted to an arm 47 secured to the shaft 43, and carries a hooked abutment 48 adapted to cooperate with a stop plate 49 carried by a lever 50 pivoted to the frame 22 at 51. The other end of the lever is connected by a link 52 to an arm 53 on a rock shaft 54 to which is secured a second arm 55 which carries the detecting roll 40 previously mentioned.

The pawl 46 carries a roll 56 which is elevated periodically by the four-lobed cam to free the abutment 48 from the stop plate 49. If at this time a slab is still passing underneath the detecting roll 40 the stop plate remains in position, and when the cam permits descent of the pawl the latter will still be held out of engagement with the ratchet. If the slab has passed beyond the detecting roll, however, the stop plate will be swung out of the way of the abutment 48 during the time the roll 56 is in contact with the cam, and when the roll is finally released the pawl will be permitted to drop into engagement with the ratchet. Once in engagement with the ratchet the pawl will carry its supporting arm 47 around through a complete revolution, causing a complete forward and back cycle of the pusher 30 through mechanism to be described, and will finally be thrown out of driving engagement by contact with the stop plate which by that time has again been lowered by the passage of a slab underneath the detecting roll 40.

As the end of frame 22 opposite the ratchet mechanism the shaft 43 carries a crank 57 pivoted to a connecting rod 58 having a cylindrical end portion 59 slidable in a housing 60 (Figs. 1, 6, and 8). This housing is pivoted at 61 to an arm 62 on a rock shaft 63. Fixed on rock shaft 63 is a gear segment 64 meshing with one of a pair of similar gears 65 fixed on an idler shaft 66. These gears in turn mesh with rack bars 67 on the bottom of the pusher 30 which slides laterally back and forth in ways 68 in the frame 22. Normally the connecting rod 58 is locked in the housing by a spring pressed conical ended plug 69 fitting into a mating depression in the cylindrical portion 59 and as the connecting rod reciprocates the pusher 30 ejects slabs onto the conveyor 31. The spring 69' holding the plug is adjustable by a threaded cap 69''. If the resistance offered by the spring is overcome by any jamming in the slab feeding mechanism the plug will be forced out of the depression, automatically returning into place on the next reverse movement of the connecting rod. This mechanism provides an overload release mechanism preventing breakage of any of the parts if a gum slab becomes jammed.

A further safety feature is provided to care for the case where, as sometimes happens, a few sticks become broken from the rear of a slab being carried along by belt 31 and lag behind as shown in Fig. 4. To permit these pieces to be pushed out of the way, the guide on that side of the belt remote from the hopper is provided with a shelf 70 (Fig. 15) having a beveled edge 71 on on its side adjacent the hopper. If a piece or so of gum is left behind the main part of the slab, like the pieces X shown in Fig. 4, the next slab forced out of the magazine will push these pieces onto the shelf (Figs. 5 and 15), where they may remain without interference with the rest of the machine until it is convenient for the operator to remove them.

As the slabs are carried by the belt 31 endwise underneath the detecting roll 40 they meet a chain 72 carried by sprockets 73 and positively driven at the same speed as the belt. This chain may extend to the end of belt 31, but to facilitate access to slabs on the belt the chain preferably terminates short of the belt, its place being taken by a roll 74 carried by arms 75 pivoted to the shaft of one of the sprockets 73 so that the roll may be swung up out of the way. The chain and roll keep the slabs flat upon the belt 31 in case they have any tendency to buckle.

The slabs are delivered by the belt upon a platform 80 (Figs. 9-14) cut away to permit the passage of a series of pushers 82 carried by a chain 83. The first part of the platform is above the tops of the pushers, as appears in Fig. 9, so that the scored gum slabs pass along solely under the frictional drive of the belt. At an intermediate point of the platform is a slanting ramp 84 over which the leading undetached gum stick projects as shown in Figs. 9 and 11. In this projecting position the gum stick strikes against the substantially radial face 85 of one of the series of ratchet-shaped teeth 86 formed on a constantly rotating breaking wheel 87. The contact with the face 85 holds up the entire gum slab on the belt 31 and the slab will be fed along at the speed permitted by the retreating tooth face.

When the tooth against which the gum slab presses has retreated sufficiently to bring the dividing line between the first and second gum sticks to the edge of the ramp (Fig. 11) the slanting or chordal part of the next tooth presses down upon the leading gum stick. The leading gum stick is by this time clear of the ramp 84, while the next following stick is still on the platform 80 (Fig. 12), the result being that the first stick will be sheared off from the second. To prevent any undesired movement of the gum stick being broken off, and to preserve the angular relationship best adapted for the breaking operation a cam wheel 88 is located underneath the breaking ratchet and rotates in a clockwise direction. As is clear from the drawings, the cam wheel has cam lobes 88' formed of a radial portion 89, an eccentric arcuate portion 89' and a chordal portion 89'', so as to furnish support for the gum stick initially at the level of the platform and then at progressively lower levels so that the rear edge of the stick will be caused to move gradually down the ramp while the front edge is constantly supported. The cam wheel 88 has half as many lobes 88' as the breaking wheel 87 has teeth, but is driven twice as fast, its radial faces moving forwardly substantially at the speed of and in registration with the pushers 82.

The platform 80 is covered by a top plate 90 having slots 91 (Fig. 10) to permit the passage of the breaking ratchet and also having a depending side 81 to furnish a side guide for platform 80. The plate itself overlies the gum slab closely enough to prevent buckling and also has a beveled portion 92 generally parallel to the ramp 84 and serving, as will be seen from Figs. 12 and 13, to prevent tipping of the broken-off gum stick. This function is assisted by a shoe 93 carried by an arm 94 pivoted at 95 to the top plate and rocked by a spring 96 so as to keep a constant yielding pressure against the forward edge of the gum stick. This yielding pressure maintain the gum stick in firm engagement with the cam 88 (Figs. 12-14).

The broken off gum sticks on the cam 88 are picked up by the pushers 82 and carried forwardly at a higher rate of speed than the initial feed rate of the slabs, so that they may be delivered to the wrapping machine in spaced relation. To hold the sticks firmly in position, the top plate is preferably provided with spring pressed pressure members 97, as is the feed table 98 of the wrapping machine. The pushers 82 carry the gum sticks onto the latter table, along which they are carried by a feeding conveyor 99 having pushers 99'.

It is desirable to be able to separate the breaking ratchet 87 from the underlying supports in order to remove any broken or jammed gum sticks. Since the breaking ratchet has to be maintained in timed relation to the cam 88, however, it is desirable that the separation be accomplished without affecting the timing. For this purpose the shaft 100 upon which the ratchet 87 is mounted is journaled in a housing 101 which is pivoted on a rod 102 (Fig. 7) carried in the frame at the back end and below the shaft 100 and which has a normally upwardly slanting arm 103. A spring 104 is attached as indicated to this arm and tends always to raise the housing to the open position shown by the dotted lines on Fig. 7. The shaft 100 on which the ratchet wheel is mounted is driven by gears 105 and 106 from shaft 107 on which the cam 88 is mounted. As is clear, when the housing is in open position the gear 105 tilts but remains in mesh with the gear 106, thereby retaining the timed relation of the ratchet wheel 87 and cam 88. With the housing in the open position there is easy access to the platform 80 as the top plate 90, shoe 93 and pressers 97 which, as shown in Fig. 9, are likewise carried by the housing 101, are swung up out of the way.

During operation, the housing is retained in its closed position by catches 108 formed in the extremities of a locking plate 109 pivoted to the housing 101 (Figs. 2 and 10) and swung by a handle 110 into or out of engagement with notches 111 in rods 112 supported on the frame. The arc of swing of the housing in going from closed to open position is limited by a stop pin 113 extending laterally of the housing and arranged to abut one of the rods 112 when the housing is in open position.

We claim:

1. A gum breaker for severing pieces of gum from slabs formed with the separate pieces defined by score lines extending from side to side of the slab comprising a feeding channel including means to feed the gum in slab form, a delivery channel including means to deliver the gum in separate pieces, an offset channel portion connecting the feeding and delivery channels, and a constantly rotating ratchet-toothed breaker wheel located adjacent said offset portion and adapted to engage the first piece of gum of a slab in the feed channel and force it along the offset portion onto the delivery channel, each of the teeth of the ratchet wheel comprising a radial portion, and a chordal portion, the chordal length of which is substantially equal to the distance between score lines on a slab, said wheel being in such position relative to the channels that as a slab is moved along the feeding channel and the wheel revolved, the front edge of the slab will first abut a radial portion of one ratchet tooth and then the chordal portion of the next tooth will engage the top of the slab and on continued rotation of the wheel force the first piece of the slab along the offset portion onto the delivery channel.

2. A gum breaker for severing pieces of gum from slabs formed with the separate pieces defined by score lines extending from side to side of the slab, comprising a feed channel including means to feed gum in slab form, a delivery channel including means to deliver the gum in separate pieces, an offset channel portion connecting the feed and delivery channels, a ratchet-toothed breaker wheel adapted to engage with its teeth successive leading pieces of gum in a slab on the feed channel, shear said pieces from the slab and force them along the offset channel portion onto the delivery channel and supporting means to engage and support the pieces of gum as they are moved by the ratchet-toothed wheel along the offset channel portion from the feeding channel to the delivery channel.

3. A gum breaker for severing pieces of gum from slabs formed with the separate pieces defined by score lines extending from side to side of the slab, comprising a feed channel, impositive means to move slabs of gum along the feed channel, a delivery channel, positive means to move separate pieces of gum along the delivery channel, an offset channel portion connecting the feed and delivery channels, breaking means adjacent the end of the feed channel to engage the first piece of gum of a slab in the feed channel and move it along the offset channel portion onto the delivery channel and into engagement with the positive motion means in the delivery channel while retaining the remainder of the slab in the feed channel and supporting means to engage and support the piece as it moves along the offset channel portion from the feeding channel to the delivery channel.

4. A gum breaker for severing pieces of gum from slabs formed with the separate pieces defined by score lines extending from side to side of the slab, comprising a feed channel, impositive means to move slabs of gum along said feed channel, a delivery channel, positive means to move separate pieces of gum along the delivery channel, an offset channel portion connecting the feed and delivery channels, breaking means adjacent the end of the feed channel to engage the first piece of gum of the slab in the feed channel and move it along the offset channel portion onto the delivery channel and into engagement with the positive motion means in the delivery channel, and additional means to engage at least two surfaces of the piece and support it as it moves along the offset portion from the feed channel to the delivery channel.

5. A gum breaker for severing pieces of gum from slabs formed with the separate pieces defined by score lines extending from side to side of the slab, comprising a magazine for receiving slabs of gum, a feed channel, means to move the slabs along the feed channel, feeding mechanism for feeding slabs successively into the feed channel from the magazine, a delivery channel adjacent the end of the feed channel, means to move separate pieces of gum along the delivery channel, and means intermediate the feed and delivery channels for breaking pieces of gum from the slabs in the feed channel and delivering them onto the delivery channel.

6. A gum breaker for severing pieces of gum from slabs formed with the separate pieces defined by score lines extending from side to side of the slab, comprising a magazine for receiving slabs of gum, a feed channel, a feed conveyor to move the slabs along the feed channel, feeding mechanism for feeding slabs successively into the feed channel from the magazine, tripping mechanism for operating the feeding mechanism when the slabs on the feed conveyor pass a detecting station in the feed channel, a delivery channel adjacent the end of the feed channel, a delivery conveyor to move separate pieces of gum along the delivery channel and breaking means intermediate the feed and delivery channels for breaking pieces of gum from the slabs in the feed channel and delivering them onto the delivery channel.

7. A gum breaker for severing pieces of gum from slabs formed with the separate pieces defined by score lines extending from side to side of the slab, comprising a magazine for receiving slabs of gum, a feed channel including means to move the slabs along the channel, feeding means to feed slabs successively from the magazine into the feed channel, intermittent motion means to operate said feeding means, tripping mechanism to start operation of the intermittent motion means when the slabs in the feed channel pass a detecting station in the feed channel, an overload release coupling the intermittent motion means to the feed means, a delivery channel adjacent the end of the feed channel including means to move separate pieces of gum along the channel, and breaking means intermediate the feed and delivery channels for breaking pieces of gum from the slabs in the feed channel and delivering them into the delivery channel.

8. A gum breaker for severing pieces of gum from slabs formed with the separate pieces defined by score lines extending from side to side of the slab, comprising a magazine for receiving slabs of gum, a feed channel running parallel to the magazine and including means to move the slabs along the channel, a side plate parallel to the side of the channel remote from the magazine and having its surface slightly raised above that of the channel with its edge next to the channel beveled to the level of the channel, intermittent motion feeding means for feeding slabs of gum laterally in succession onto the feed channel, a delivery channel adjacent the end of the feed channel including means to move separate pieces of gum along the delivery channel, and breaking means intermediate the feed and delivery channel for breaking pieces of gum from slabs in the feed channel and delivering them into the delivery channel whereby full length slabs of gum may be fed from the magazine into the feed channel and pass through the gum breaker with the separate pieces being delivered by the delivery channel while pieces of gum broken from the slabs by the feeding action of the feed mechanism may be ejected from the feed channel onto the side plate during lateral feeding of the following slabs into the feed channel.

9. A gum breaker for severing pieces of gum from slabs formed with the separate pieces defined by score lines extending from side to side of the slab comprising a channel having a feed portion along which slabs of gum are moved, a delivery portion along which separate pieces of gum are delivered and an offset portion connecting the first two portions, a housing mounted adjacent the channel for pivotal motion about an axis to one side of and parallel to the channel and gum breaker means carried by the housing for engaging the first piece of gum of the slab in the feed portion of the channel and forcing it down the offset portion onto the delivery portion while retaining the remainder of the slab in the feed portion, whereby said housing may be rotated around its axis to remove the gum breaker means from its operative position in relation to the channel to permit access to the channel.

10. A gum breaker for severing pieces of gum from slabs formed with the separate pieces defined by score lines extending from side to side of the slab comprising a channel having a feed portion along which slabs of gum are fed, a delivery portion along which separate pieces of gum are delivered and an offset portion connecting the first two portions, a housing mounted adjacent the channel for pivotal motion about an axis to one side of and parallel to the channel, gum breaker means carried by the housing for engaging the first piece of gum of a slab in the feed portion of the channel and forcing it down the offset portions onto the delivery portion, a driven gear for said breaker means located in the housing with its axis perpendicular to and slightly to one side of the pivot, a driving gear in mesh with the driven gear with its axis perpendicular to and located on the other side of said pivot, and limiting means for limiting rotation of the housing to an arc where the driven and driving gear are at the point of leaving mesh whereby said housing may be rotated about its pivot to remove the gum breaker means from its operative position in relation to the channel to permit access to the channel without disturbing the timed relation between the gum breaker means and the driving gear.

11. A gum breaker for severing pieces of gum from slabs formed with the separate pieces defined by score lines extending from side to side of the slab, comprising a feeding channel including means to feed gum in slab form, a delivery channel including means to deliver gum in separate pieces, an offset channel portion connecting the feed and delivery channel, a constantly rotating ratchet-toothed breaker wheel located adjacent said offset portion and having its teeth shaped to engage successive leading pieces of gum in a slab in the feeding channel, shear said pieces from the slab and force them along the offset channel portion onto the delivery channel, and a constantly rotating cam member having peripheral lobes shaped to engage and support on their surfaces pieces of gum as they are moved along the offset channel portion from the feeding channel to the delivery channel, the number of lobes on said cam being an integral fraction of the number of teeth on the ratchet wheel and the speed of rotation of the cam with relation to that of the ratchet wheel being the inverse of the integral fraction.

12. A gum breaker for severing pieces of gum from slabs formed with the separate pieces defined by score lines extending from side to side of the slab, comprising a feeding channel including means to feed gum in slab form, a delivery channel including means to deliver gum in separate pieces, an offset channel portion connecting the feeding and delivery channels, a constantly rotating ratchet-toothed breaker wheel located adjacent said offset channel portion and having its teeth shaped to engage successive leading pieces of gum in a slab in the feeding channel, shear said pieces from the slab, and force them along the offset channel portion from the feeding channel to the delivery channel, a cam rotating in timed relation to the breaker wheel and having peripheral lobes each lobe comprising a radial portion and a generally spiral portion, said cam being in such position relative to the channels that a piece of gum broken from the slab in the feeding channel will be supported by the spiral portion and then will be moved forward into the feed channel by the radial portion of a cam lobe as the piece is forced along the offset channel portion and onto the delivery channel by the breaker wheel.

13. A gum breaker for severing pieces of gum from slabs formed with the separate pieces defined by score lines extending from side to side of the slab, comprising a feeding channel including means to feed gum in slab form, a delivery channel including means to deliver gum in separate pieces, an offset channel portion connecting the feeding and delivery channels, a constantly rotating ratchet-toothed breaker wheel located above said offset channel portion and having its teeth shaped to engage successive leading pieces of gum in a slab in the feeding channel, shear said pieces from the slab, and force them down the offset channel portion from the feeding channel to the delivery channel, a multi-lobed cam located under the breaker wheel and rotating in timed relation to the breaker wheel, and a stationary presser shoe located over the cam, the cam being adapted to engage with its lobes the underside and the shoe the forward upper edge of each piece, whereby the cam and the shoe coact to support the pieces as it passes along the offset channel portion onto the delivery channel.

14. A gum breaker for severing pieces of gum from slabs formed with the separate pieces defined by score lines extending from side to side of the slabs, comprising a feeding channel including means to feed gum in slab form, a delivery channel including means to deliver gum in separate pieces, an offset channel portion connecting the feeding and delivery channels, a constantly rotating ratchet-toothed breaker wheel located adjacent said offset channel portion and having its teeth shaped to engage successive leading pieces of gum in a slab in the feeding channel, shear said pieces from the slab and force them along the offset channel portion from the feeding channel to the delivery channel, a cam rotating in timed relation to the breaker wheel and having peripheral lobes, each lobe comprising a radial portion, an eccentric arcuate portion and a chordal portion, said cam being in such position relative to the channels that a piece of gum broken from the slab in the feeding channel will be supported first by the arcuate portion, then the chordal portion, and finally will be moved forward into the feed channel by the radial portion of a cam lobe as the piece is forced along the offset channel portion and onto the delivery channel by the breaker wheel.

15. A gum breaker for breaking pieces of gum from slabs formed with spaced score lines extending from side to side of the slab, comprising a stationary table, means to move a slab of gum continuously over the table, and breaking means operable first to engage the leading piece of gum when the slab has been advanced over the table with the first score line in the slab overlying the leading edge of the table and then to break the leading piece of gum from the slab by downward pressure.

16. A gum breaker for breaking pieces of gum from slabs formed with spaced score lines extending from side to side of the slab comprising a stationary table, means to move a slab of gum continuously over the table, and breaking means operable first to engage the leading piece of gum when the slab has been advanced over the table with the first score line in the slab overlying the leading edge of the table, and then to break the leading piece of gum from the slab by downward pressure without stopping the motion of the slab.

17. A gum breaker for breaking pieces of gum from slabs formed with spaced score lines extending from side to side of the slab comprising a magazine for receiving slabs of gum, breaking mechanism to break the slab into separate pieces along the score lines, feeding means to carry slabs of gum continuously to the breaking mechanism, ejecting mechanism for feeding slabs of gum from the magazine to the feeding means, and tripping mechanism for operating the ejecting mechanism when slabs carried by the feeding means pass a detecting station.

18. A gum breaker for breaking pieces of gum from slabs formed with spaced score lines extending from side to side of the slab comprising means to hold a supply of slabs, mechanism to break a slab into separate pieces along the score lines, and means to remove slabs successively from said first-named means and then feed them into the breaking mechanism including means to reject pieces of gum broken from slabs during removal from said first-named means.

19. A gum breaker for severing pieces of gum from slabs formed with spaced score lines extending from side to side of the slab comprising a channel along which slabs of gum are moved, a housing mounted adjacent the channel for pivotal motion about an axis at one side of and parallel to the channel and gum breaker means carried by the housing for engaging the first piece of gum of the slab in the channel and breaking it from the slab whereby said housing may be rotated around its axis to remove the gum breaker means from its operative position in relation to the channel to permit access to the channel.

ELMER LOVELL SMITH.
EDWARD F. CORNOCK.